US010345096B2

(12) United States Patent
Allen

(10) Patent No.: US 10,345,096 B2
(45) Date of Patent: Jul. 9, 2019

(54) OPTICAL STRAIN GAUGE

(71) Applicant: ILLINOIS TOOL WORKS INC., Glenview, IL (US)

(72) Inventor: Roy D. Allen, North Andover, MA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 158 days.

(21) Appl. No.: 15/321,934

(22) PCT Filed: Jun. 7, 2015

(86) PCT No.: PCT/US2015/034602
§ 371 (c)(1),
(2) Date: Dec. 23, 2016

(87) PCT Pub. No.: WO2015/199957
PCT Pub. Date: Dec. 30, 2015

(65) Prior Publication Data
US 2017/0146338 A1    May 25, 2017

Related U.S. Application Data

(60) Provisional application No. 62/018,071, filed on Jun. 27, 2014.

(51) Int. Cl.
*G01B 11/16* (2006.01)
*G01L 1/24* (2006.01)

(52) U.S. Cl.
CPC .......... *G01B 11/161* (2013.01); *G01B 11/165* (2013.01); *G01L 1/246* (2013.01)

(58) Field of Classification Search
CPC ...... G01B 11/161; G01B 11/165; G01L 1/246
See application file for complete search history.

(56) References Cited

U.S. PATENT DOCUMENTS 2,787,834 A * 4/1957 Shoup .................. G01B 11/165
33/790
6,075,893 A * 6/2000 Brandstetter .......... G01B 11/26
356/605
(Continued)

FOREIGN PATENT DOCUMENTS

CN     102498371     6/2012
CN     102498368     6/2016
(Continued)

OTHER PUBLICATIONS

ISR and WO for PCT/US2015/034602 mailed Aug. 3, 2015.

*Primary Examiner* — Jamel E Williams
(74) *Attorney, Agent, or Firm* — McCarter & English, LLP

(57) ABSTRACT

This disclosure presents a method of measuring the strain response of a test material remotely by optical devices using a thin multi-layer assembly, called an optical strain gauge, which is attached directly to the test specimen by pair of adhesive patches built into the assembly. The optical strain gauge assembly attaches quickly and easily by just pressing it onto the specimen by virtue of the two pressure-activated adhesive patches. There is typically no surface preparation necessary for the test specimen. The spatial separation between the two patches adhered to the specimen surface serves to establish an initial gauge length for calculating strain by measuring the stress induced changes to this separation when a load is applied to the test specimen.

24 Claims, 11 Drawing Sheets

(56) References Cited

U.S. PATENT DOCUMENTS

| | | | | |
|---|---|---|---|---|
| 6,164,847 A | * | 12/2000 | Allen | ............... G06T 5/50 |
| | | | | 400/74 |
| 7,047,819 B2 | * | 5/2006 | Hayford | ............... G01N 3/02 |
| | | | | 73/800 |
| 2012/0176629 A1 | * | 7/2012 | Allen | ............... G01D 5/34746 |
| | | | | 356/616 |

FOREIGN PATENT DOCUMENTS

| | | | |
|---|---|---|---|
| DE | 3120653 A1 | | 12/1982 |
| EP | 0255300 A2 | | 2/1988 |
| JP | H09236409 A | | 9/1997 |
| JP | 2012247229 A | * | 12/2012 |
| WO | 2011034910 A2 | | 3/2011 |

* cited by examiner

Stick On OSG Construction

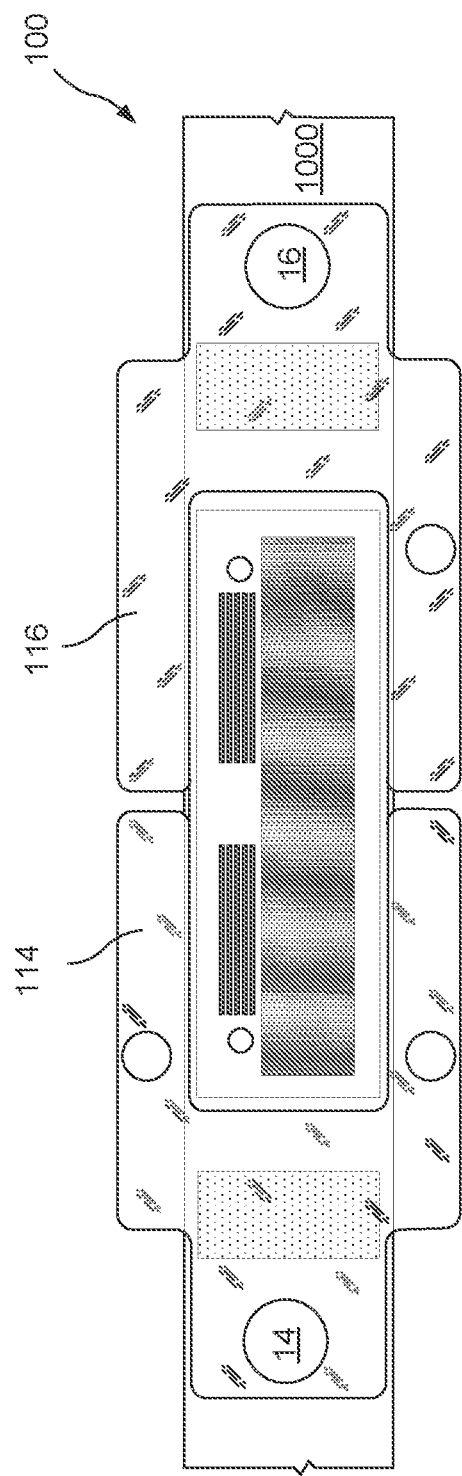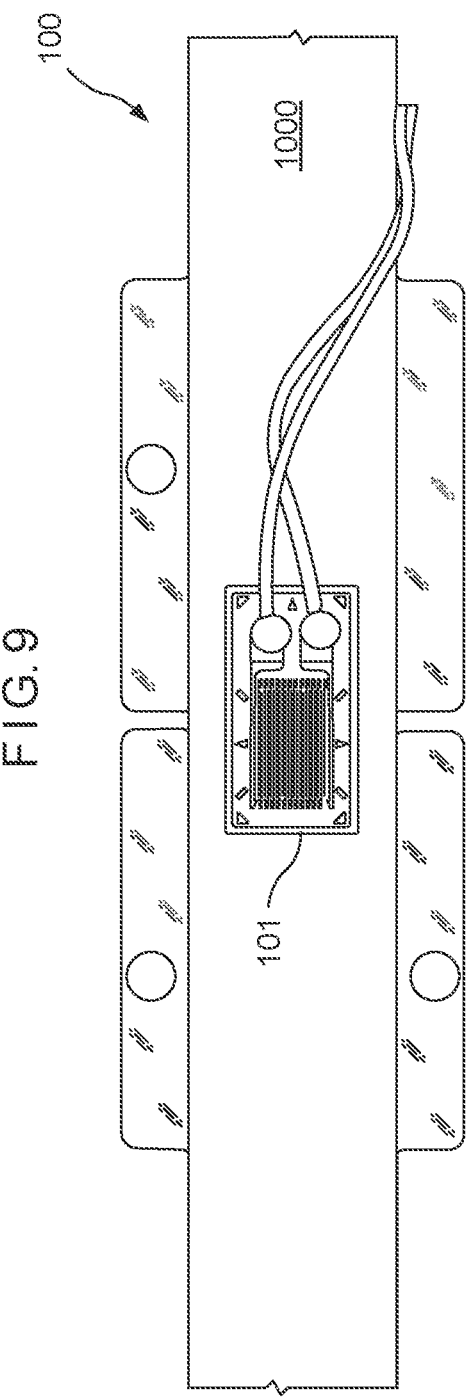

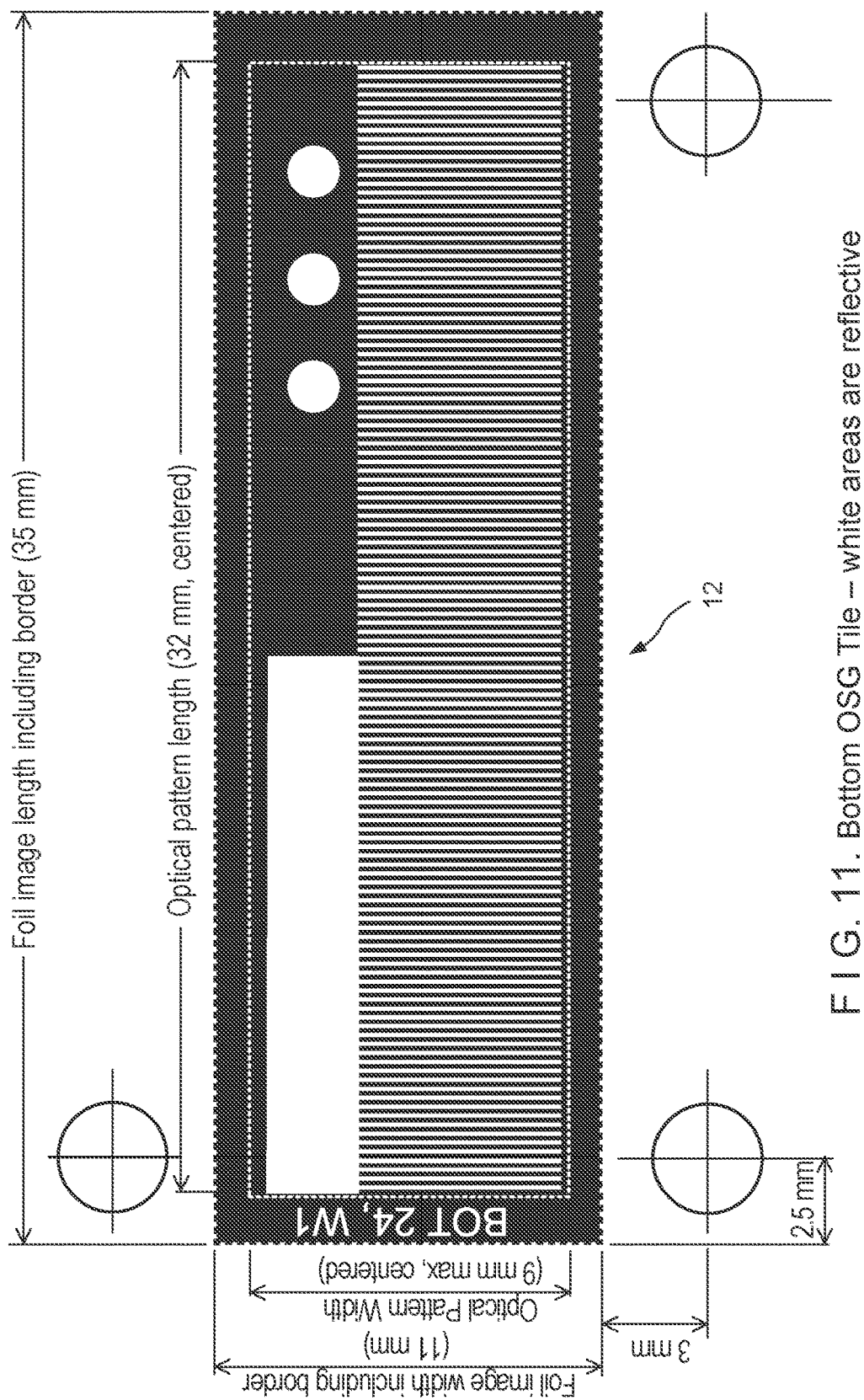
FIG. 11. Bottom OSG Tile – white areas are reflective

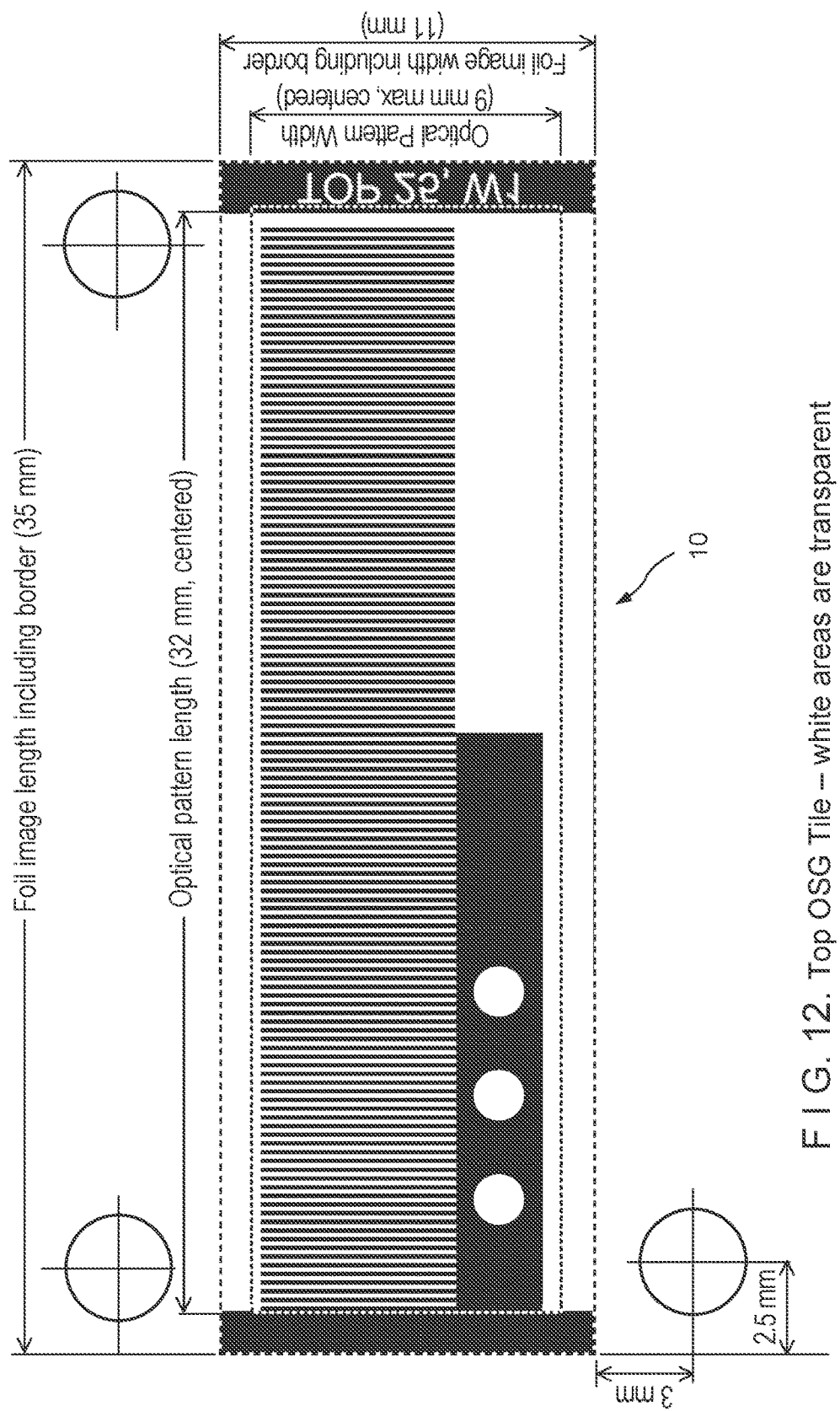
FIG. 12. Top OSG Tile – white areas are transparent

Pattern # 1

Pattern # 2

Dual axis OSG displacement measured pattern
(Fundamental #1, fundamental #2, both foils overlaid)

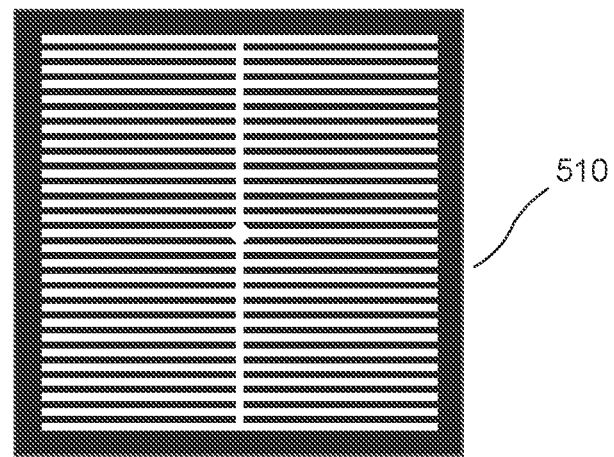
F I G. 15
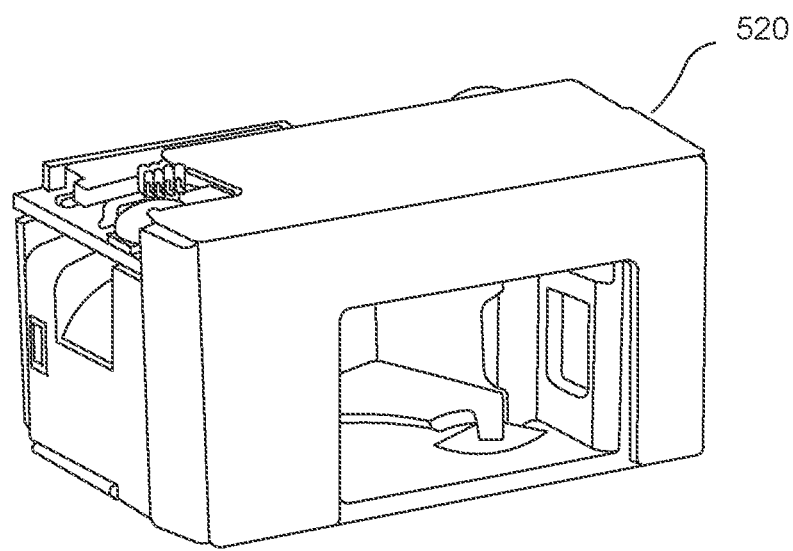
F I G. 16

OPTICAL STRAIN GAUGE

This application is a National Phase of International Application No. PCT/US2015/034602, filed Jun. 7, 2015, and claims priority under 35 U.S.C. 119(e) of U.S. provisional patent application Ser. No. 62/018,071, filed on Jun. 27, 2014, the disclosure of which is hereby incorporated by reference in its entirety, for all purposes, and made a part thereof.

BACKGROUND OF THE DISCLOSURE

Field of the Disclosure

The disclosure relates to a method of remotely measuring strain response of a test material by optical methods using a thin multi-layer assembly.

Description of the Prior Art

U.S. Patent Publication No. 2012/0176629 A1, entitled "Remote Displacement Sensor, Including an Optical Strain Gauge, an Assembly and System Therewith", was published on Jul. 12, 2012, based upon PCT/US10/048921. This patent application, by the same inventor as the present application, discloses a remote displacement sensor, such as an optical strain gauge, which uses an optical amplifier implemented by patterns, such as, but not limited to, moire patterns, to calculate changes in position or gauge length. In the embodiment implemented as a strain gauge with moire patterns, two foil layers are provided, a lower foil layer with a reference or static moire pattern generated by the overlaying of a first pattern with parallel lines at a first fundamental frequency and a second pattern with parallel lines at a second fundamental frequency. The lower foil layer further includes a first section with a first pattern with parallel lines at the first fundamental frequency while the upper layer provides a second section with a second pattern with parallel lines at the second fundamental frequency. The overlaying of the foils causes an overlying of the first and second sections thereby causing a moire pattern of the same wavelength as the reference pattern. However, relative movement of the two foils perpendicular to the parallel lines, in response to a movement in the gauge length in response to strain on the specimen, causes a phase change in the overlaid pattern which is greater than the relative movement. The image of the optical strain gauge is captured by a camera or other optical device and the resulting image is processed by a Fast Fourier Transform or similar algorithm to determine the phase change, thereby calculating the change in gauge length and therefore the resulting strain.

While this application is well-adapted to its intended purposes, further improvements to this disclosure are sought.

Additionally, with respect to other clip-on extensometers, composite materials are very stiff and tend to break explosively in tensile testing. This prevents the use of clip-on type of extensometers because they are typically damaged by the forces of the break. These types of extensometers are expensive, costing thousands of dollars, and are therefore not intended to be single-use devices. Non-contact optical extensometers, often costing more than $50,000 are typically not able to measure strain to the accuracy necessary to determine correct modulus on such stiff materials. Measuring modulus on composite materials typically requires strain accuracy error less than 20 micro-strain units (a gauge length change of 20 parts per million) at very low strain levels, typically in the 0.1%-0.6% strain range. This is equivalent to sub-micron displacement measurement accuracy at a gauge length of 50 millimeters.

The composites industry therefore relies on the standard bonded strain gauge to achieve the necessary strain accuracy and be within acceptable cost as a single use device. The bonded gauge consists of a precisely etched sheet of thin metal foil about 10 millimeter by 10 millimeter (typically using integrated circuit level microlithography accuracy) that is epoxy bonded onto the surface of the surface of the specimen. It measures strain by producing tiny changes of electrical resistance as it is stressed. To measure these subtle resistance changes it is electrically wired into an external bridge amplifier circuit. Before bonding the metal foil the specimen surface has to be specially prepared by machining a precisely flat surface, polishing and then removing any residual debris by use of a chemical bath.

The bonded gauge process is typically as follows for every specimen tested—machine, polish and clean the surface of the specimen; chemical wash (often 2 baths); very carefully position the foil gauge wherein alignment is critical given its short active length; prepare and apply a uniform layer of epoxy over the device and wait for drying; solder wires to the metal pads on the device and connect the specimen to external electrical bridge circuit when it is mounted in load frame These steps add up to significant installation labor time for every test. Additionally, the costs of bare foil strain gauge ranges can be considerable. Statistically, the preparation steps can be potentially damaging to the specimen material due to, for example, possible effects of the chemicals used and cuts and dings into the specimen.

Further prior art includes art includes U.S. Pat. No. 7,047,819 entitled "Testing of Samples" by Haywood; U.S. Pat. No. 6,075,893 entitled "Computer Controlled Optical System for Angular Alignment of Structures Using Moire Patterns" to Brandstetter; U.S. Pat. No. 6,164,847 entitled "Image Parameter Detection" to Roy Allen (the present inventor); U.S. Pat. No. 2,787,834 entitled "Grating Strain Gauges" to Shoup; DE 3120653 A1 entitled "Device for Determining Movement parameters and Creep States of Materials" to Ludwig and EP 0255300 A2 entitled "High Sensitivity Strain Detector" to Buckingham and Blackwood.

OBJECTS AND SUMMARY OF THE DISCLOSURE

It is therefore an object of the present disclosure to develop further improvements with respect to the optical strain gauge.

This disclosure presents a method of measuring the strain response of a test material remotely by optical devices using a thin multi-layer assembly, called an optical strain gauge or OSG, which is attached directly to the test specimen by simply using a pair of adhesive patches built into the assembly. The small planar foil assembly is typically very light, about 1 gram, and adheres flush onto the surface of the test material when attached. The OSG assembly attaches by pressing it onto the specimen by virtue of the two pressure-activated adhesive patches. There is typically no surface preparation necessary for the test specimen. The spatial separation between the two patches adhered to the specimen surface serves to establish an initial gauge length (L) for calculating strain by measuring the stress induced changes to this separation ($\Delta L$) when a load is applied to the test specimen.

BRIEF DESCRIPTION OF THE DRAWINGS

Further objects and advantages of the disclosure will become apparent from the following description and from the accompanying drawing, wherein:

FIGS. 9 and 10 are views of a further embodiment of the optical strain gauge of the present disclosure.

FIG. 11 is a plan view of a typical bottom foil for an optical strain gauge of the present disclosure.

FIG. 12 is a plan view of a typical top foil for an optical strain gauge of the present disclosure.

FIG. 15 illustrates a visually projected pattern using a diffractive optical element for a further embodiment of the optical strain gauge of the present disclosure.

FIG. 16 illustrates a compact flying spot laser scanner and single photodiode read head which may be used in a further embodiment of the disclosure.

DETAILED DESCRIPTION OF THE PREFERRED EMBODIMENT

Figure 1:
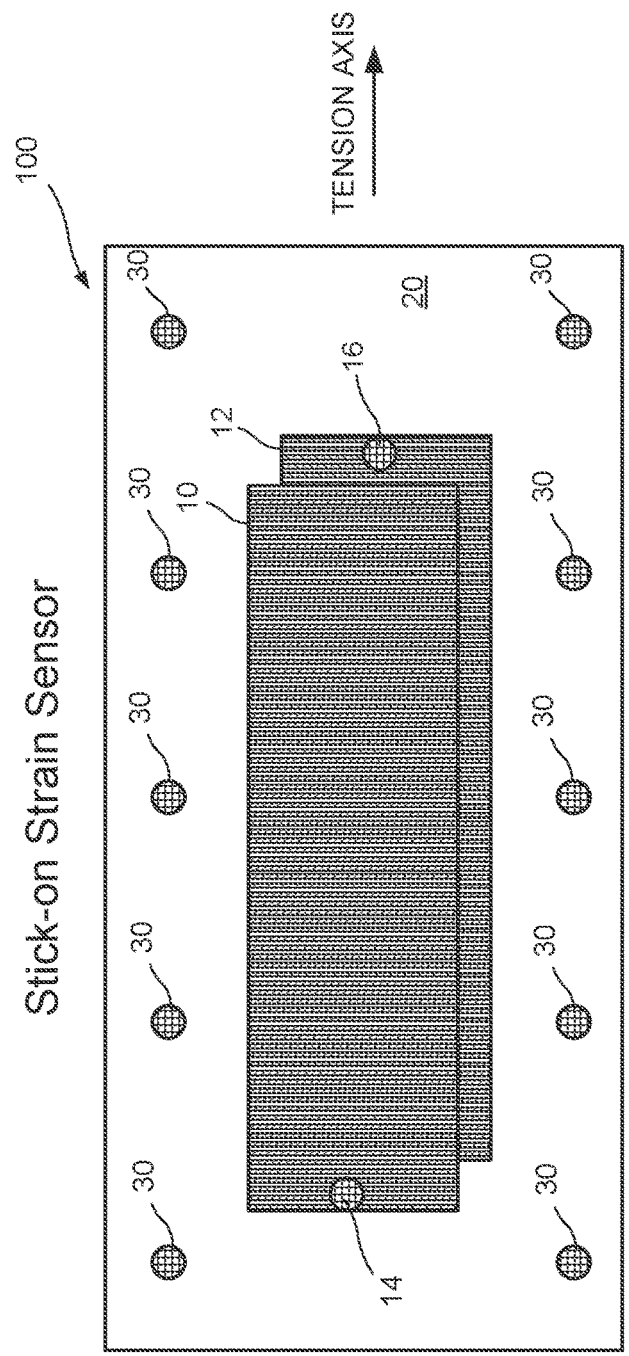
FIG. 1 is a top view of an embodiment of the optical strain gauge of the present disclosure.
Figure 2:
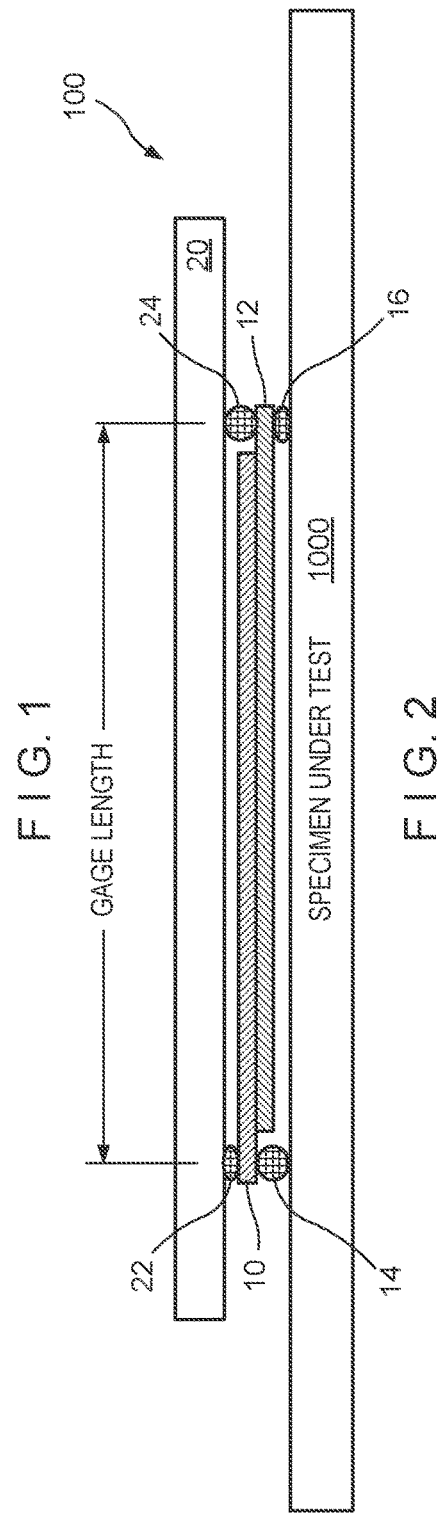
FIG. 2 is a side view of an embodiment of the optical strain gauge of the present disclosure.
Figure 8:
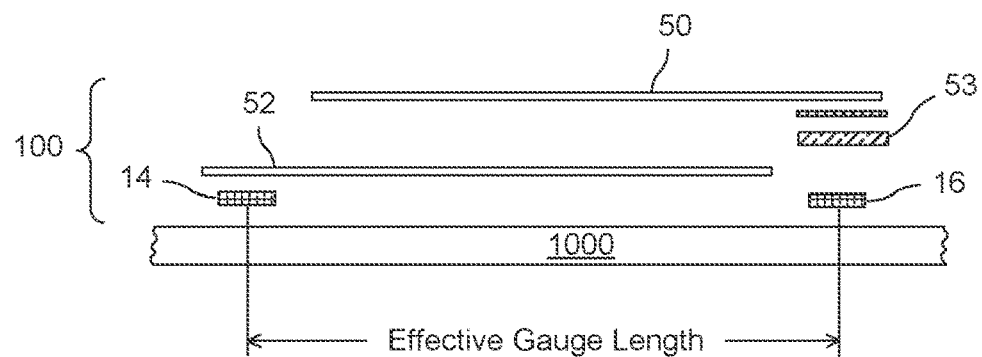
FIG. 8 is a side view of the optical strain gauge of FIGS. 6 and 7.

Referring now to the drawings in detail, wherein like numerals refer to like elements throughout the several views, one sees that FIGS. 1 and 2 illustrate how an embodiment of the multi-layer optical strain gauge assembly 100 works. There is a first grating foil 10 overlapping a second grating foil 12. First and second grating foils 10, 12 may be a polyester substrate having high contrast grating patterns which generate a moire pattern or similar pattern of modulated intensity when overlapped. The first grating foil 10 is attached to the specimen under test 1000 by a first adhesive patch 14. Likewise, the second grating foil 12 is attached to the specimen under test by a second adhesive patch 16. The first and second grating foils 10, 12 are also held in place against transparent compliant layer 20 by third and fourth adhesive patches 22, 24, respectively. The sensor 100 is further held against the specimen 1000 by auxiliary adhesive patches 30 about the periphery of transparent compliant layer 20. The movement of the first or second adhesive patch 14, 16 holding the respective first or second grating foil 10, 12 to the surface of the specimen under test 1000 causes the first or second grating foil 10, 12 to move by exactly the same amount. The first and second grating foils 10, 12 therefore follow the strain induced movements of the specimen surface at its associated physical contact point, the first and second adhesive patches 14, 16. The transparent compliant layer 20 is expected to be much more elastic than the specimen 1000 so that third and fourth adhesive patches 22, 24 can follow the strain induced movement from the specimen 1000. When the specimen 1000 is strained the two grating foils 10, 12 with high contrast grating patterns slide over each resulting in an overlapped region where both patterns together generate a highly visible interference effect that changes in direct proportion to the foil motions. This highly visible effect, a moiré interference pattern, for example, is observed and tracked at a distance by a remote camera (not shown). In this manner the subtle strain motions of the two gauge points on the specimen, reflected in the phase change (and corresponding translation) or similar change in the pattern of modulated intensity, are wirelessly conveyed to the camera for interpretation by standard image processing techniques, such as Fourier Transform Processing, to produce a real-time highly accurate measurement of specimen strain at a remote distance. It is noted that third and fourth adhesive patches 22, 24 may be optional. The elimination of third and fourth adhesive patches 22, 24 results in an embodiment such as is illustrated in FIG. 8. In such an embodiment, compliant layer 20 may become part of the packaging that is used during the storage of the multi-layer optical strain gauge assembly 100, but is removed during the installation of the multi-layer optical strain gauge assembly 100 and therefore does not need to be transparent. That is, compliant layer 20 may be implemented on the top and bottom of the multi-layer optical strain gauge assembly 100 as packaging, thereby allowing the user to install the multi-layer optical strain gauge assembly 100 by peeling off the compliant layer or layers 20 and securing the multi-layer optical strain gauge assembly 100 to the specimen 1000. As a further alternative, third and fourth adhesive patches 22, 24 can be eliminated and auxiliary adhesive patches 30 retained, so that the transparent compliant layer 20 is attached to the specimen 1000 and holds the multi-layer optical strain gauge assembly 100 in place without any direct adhesive attachment thereto.

As shown in FIG. 1, first and second grating foils 10, 12 used to generate an interference pattern that highly magnifies strain between two well-defined points on the specimen surface. First and second grating foils 10, 12 are attached by two small adhesive points (first and second adhesive dots 14, 16) that function like ink dots on the specimen 1000 to define a known gage length. Opposite ends of the first and second grating foils 10, 12 are mechanically coupled to the specimen 1000 by respective first and second adhesive dots 14, 16, while the remaining ends of first and second grating foils 10, 12 are uncoupled. The first and second grating foils 10, 12 are free-floating in the measurement direction to allow them to slide over one another under tensile strain without causing any change to the pitch on the grating foils 10, 12. Both grating foils 10, 12 move in the direction of tension, following the surface of specimen 1000 sampled by their respective adhesive contact points 14, 16. These are disposable grating sensors that are mass printed at high resolution on a roll of thin transparent substrate. The precise locations of the first and second adhesive dots 14, 16 are also established by a lithographic mask (which may be printed or similarly implemented). The user applies the stick-on sensor or array of sensors just as if it were a single piece of tape. No precise positioning or handing is typically necessary. A single sensor or array of sensors is read remotely in one video frame. This typically requires less critical optical system and less video processing than if remotely tracking an individual feature such as a small dot. Therefore, one micron-level measurements of small features at long stand-off distances are typically not necessary. One micron video measurements at long stand-off distances are typically not necessary. The interference pattern may have a sinusoidal intensity wherein the strain-induced changes in the gauge length causes phase changes in the interference pattern, whereby the shifts in the sinusoidal pattern are twenty or more times the change in gauge length. This factor of twenty or more is referred to as an optical gain factor.

FIGS. 3A, 3B, 4 and 5 illustrate an embodiment including a reference pattern 40 (typically formed on one of the grating foils 10, 12) how the moire interference pattern is generated by the two overlapping grating patterns 10, 12 as well as a method of processing the camera images to measure changes in gauge length (ΔL). It should be noted that the adjacent and separate fixed reference pattern 40 shown in the figure is optional and not necessary if the camera is able to resolve the fine pitch of the two fundamental patterns.

Figures 3A, 3B:
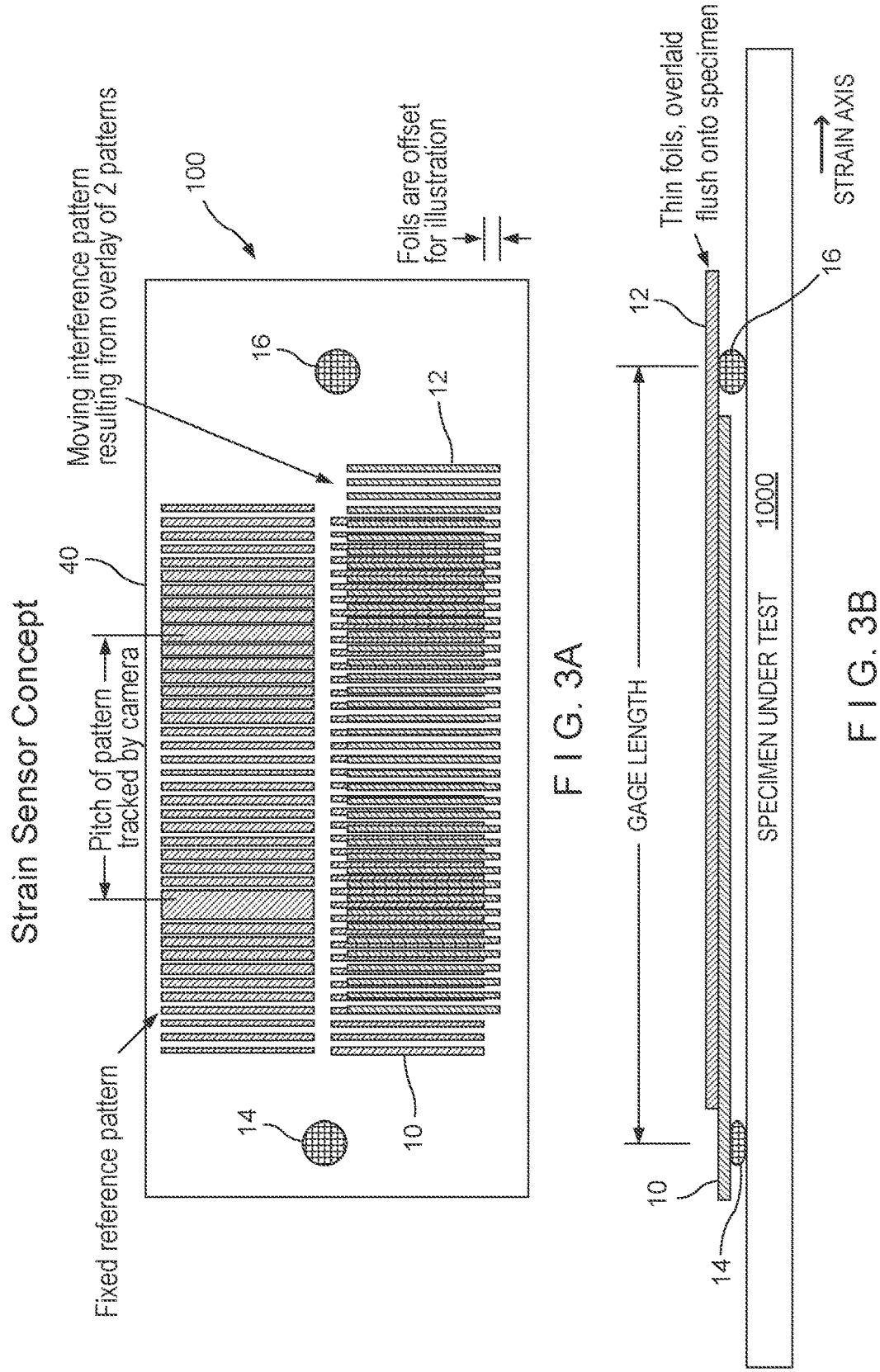
FIG. 3A is a top view of an embodiment of the optical strain gauge of the present disclosure, including a reference pattern.
FIG. 3B is a side view of an optical strain gauge of the present disclosure, including a reference pattern.
Figure 4:
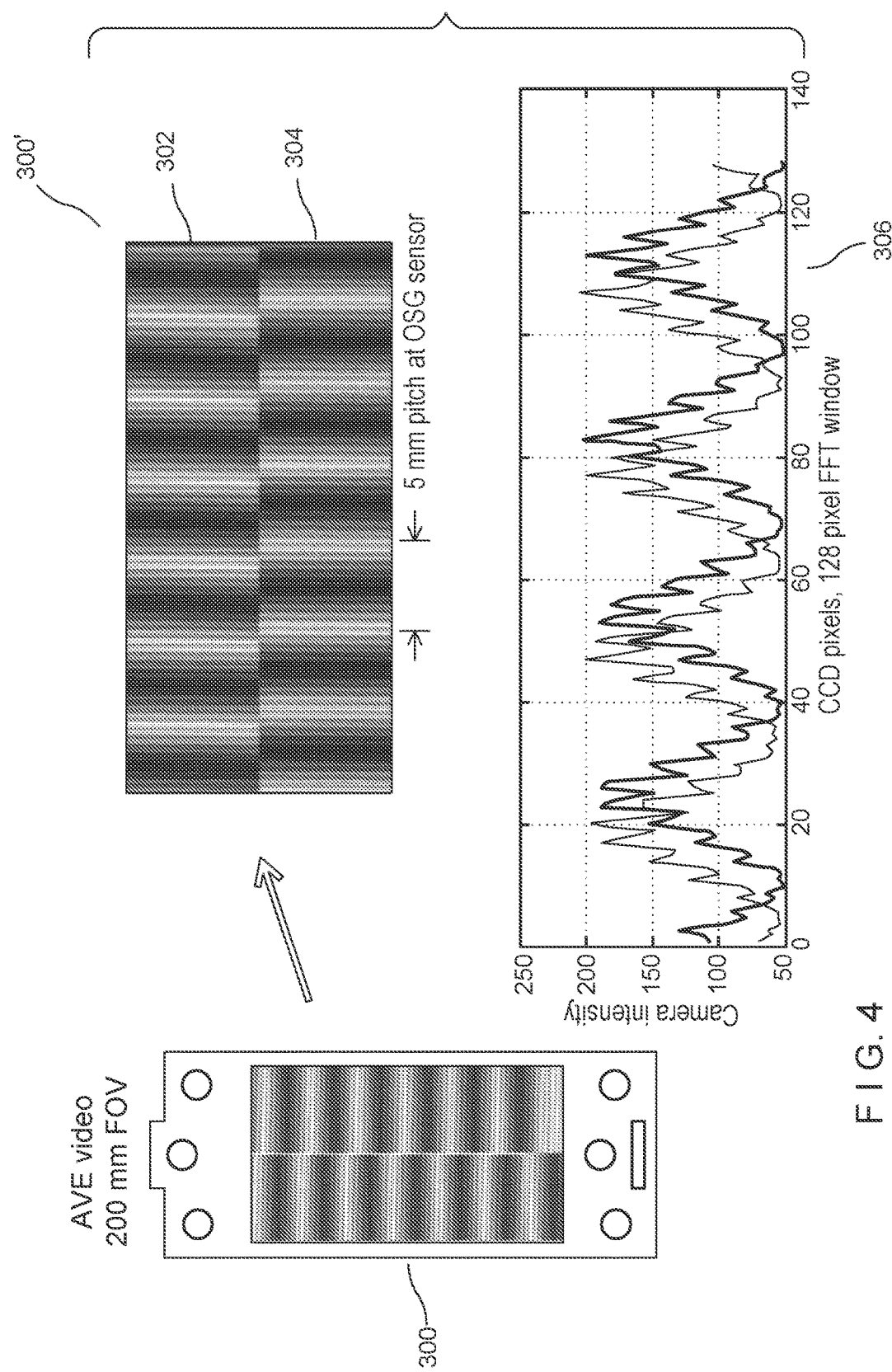
FIG. 4 illustrates the camera view of the optical strain gauge of FIGS. 3A and 3B.
Figure 5:
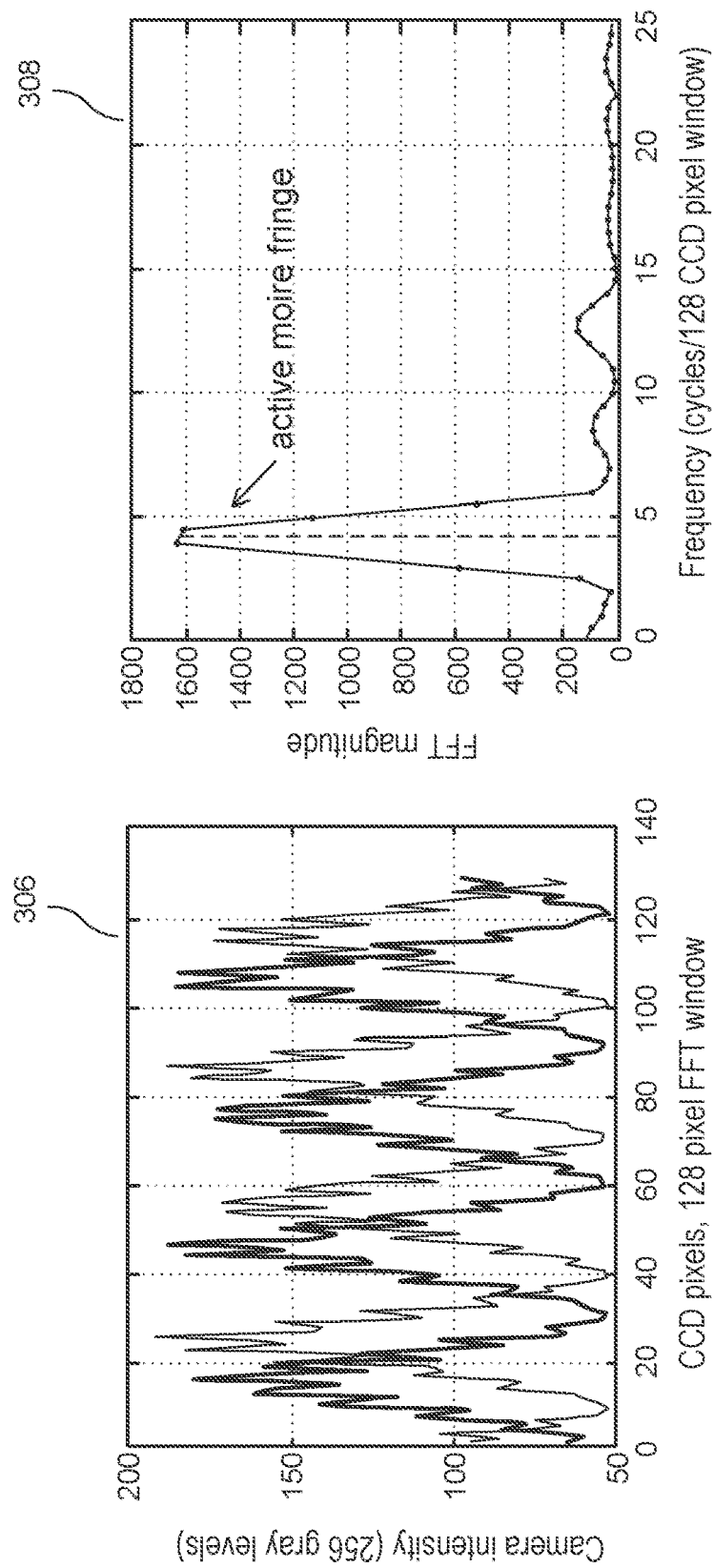
FIG. 5 illustrates the sensor processing of the optical strain gauge of FIGS. 3A and 3B.

FIGS. 3A and 3B illustrate an embodiment of a stick-on optical strain gauge 100 (or OSG) with a fixed reference pattern 40 and further including visible first and second adhesive contact patches 14, 16 that hold the foils 10, 12 to the specimen 1000 and establish a gage length measurable by the camera. The sensor 100 includes two superimposed foils 10,12 that slide over each other. Displacement is measured by comparing the phase of the moving interference pattern to a fixed reference pattern 40. As shown in FIG. 4, typical processing includes obtaining an AVE video image 300 with a 200 millimeter field of view and then obtaining a fringe image 300' which compares the reference fringe image 302 (of modulated sinusoidal intensity) with the active fringe image 304 (of modulated sinusoidal intensity). Then, the CCD pixels are used to generate a 128 pixel FFT (fast fourier transform) window 306. As shown in FIG. 5, the active and reference image regions are collapsed into intensity signals by averaging each region in an orthogonal axis, as shown in 306 and 308. The phase of the active and reference signals are tracked by FFT methods for high noise rejection. The gauge change for a given video frame is the phase difference between the active and reference signals. The phase-to-millimeter conversion factor is calculated from a known pattern geometry and live FFT pitch measurements.

In a further embodiment of the disclosure, the optical strain gauge 100 is printed with more coarse grating lines so that the fundamental grating pitch will indeed be visible to the camera. Therefore one of the fundamental patterns can be used as common mode position reference. Further, the expected optical magnification of the camera-lens system (field of view of 60 mm) will be more than 3× higher than shown in these figures, thereby providing proportionately higher pixel sampling of the signal intensity waveforms.

Figure 6:
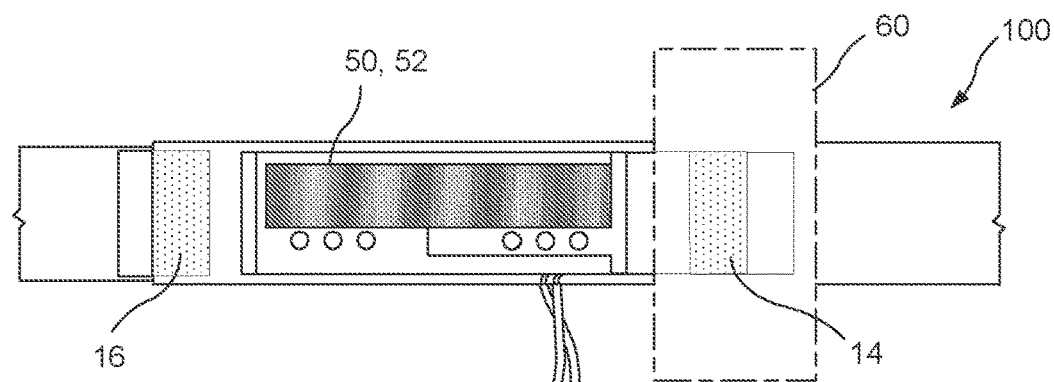
FIGS. 6 and 7 illustrate an embodiment of the optical strain gauge wherein two foils are held directly on the specimen by adhesive patches.
Figure 7:
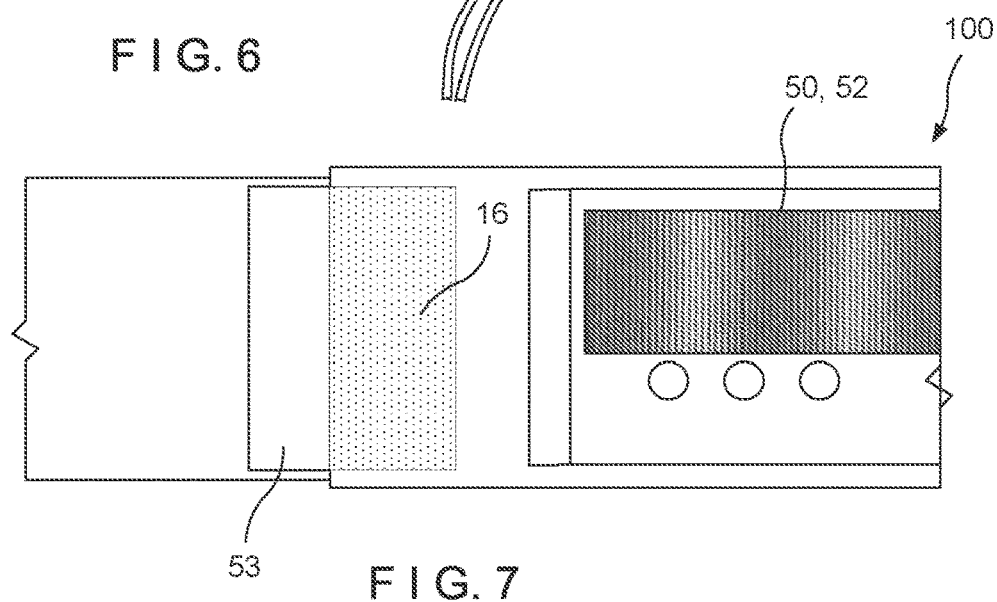

A further embodiment of the present disclosure is a peel-and-stick self-adhering optical displacement sensor as shown in FIGS. 6, 7 and 8. This embodiment is intended to be a further refinement in some applications with respect to the standard bonded strain gauge in the measurement of strain on composite materials and other materials with similar measurement challenges.

This further embodiment of the disclosure may typically offer substantial advantages over the bonded gauge.

These typical advantages include that no surface preparation is required—particularly important on composites which have a wide range of deep fabric-like surface textures in their natural state; there is no risk of altering the performance of the material by machining it; wireless techniques are used so that strain is measured remotely by inexpensive low resolution camera; a passive sensing device is used so that no power, no wires and no amplifiers are required; quick and easy peel and stick installation; there is a peel-off the bottom protective layer to uncover the two adhesive patches; the device is placed on the specimen and finger pressure is applied to engage the adhesive; the top protective layer that holds the OSG components in alignment is then peeled off so that the foils are free to move and installation is complete. Moreover, built-in edge guide features are provided for easy alignment; alignment tolerance less critical than for a bonded gauge; installation could be automated for robotic test fixtures; strain measurement accuracy is equal or superior to the bonded gauge; and a very low cost is achieved, typically much lower than the bonded gauge.

The optical strain gauge is produced using standard inks on high volume printing press, typically no exotic materials and no IC-level microlithography process like a bonded gauge. A much higher dynamic range of strain measurement is typically achieved than with a bonded gauge in that a bonded gauge limited to a few percent before it becomes non-linear and deforms whereas an optical strain gauge which does not deform is linear throughout its range and is not inherently limited to a maximum strain and further provides self-calibration features. A bonded gauge has no independent method of gauge factor (gain) measurement accessible to the user—just a value from the factory based on lot testing. In contrast, OSG gain can be quickly measured in-situ during the test from knowledge of its pattern geometry such as pitch ratio of patterns, gauge separation of adhesive patches. These OSG calibration features are always accessible for other independent methods of verification by the user, if necessary, such as by digital microscope. Moreover, the OSG is able to measure repetitive strain cycles without the inherent fatigue limitations of a bonded gauge; performance is superior to non-contact optical extensometers; the OSG provides submicron measurement accuracy and is insensitive to imaging parameter variations that are usually critical for optical strain measurement such as camera vibration, Z-axis position (depth) variations, dynamic variations of illumination, air current refraction effects, focus quality, and tilt in Z-axis. OSG is self-calibrated in a coordinate space local to the specimen surface—no need to calibrate the location and stability of the remote camera whereas non-contact optical extensometers typically must calibrate the entire workspace volume that encompasses both the camera and the mounted specimen—everything in this global workspace volume typically must remain stable after calibration.

This further embodiment is a stick-on optical strain gauge as shown in FIGS. 6, 7 and 8. It typically includes two polyester photographic films 50, 52 attached directly to a composite specimen 1000 using only a small 6×12 millimeter patch of double-sided adhesive tape for each film, as shown in FIGS. 6 and 7. This might be considered to be one of the most basic OSG configurations. The gauge length is established by the centers of the adhesive patches typically without need of using any hard pins or knife edges as a method to establish mechanical gauge contact with the specimen surface. Each patch also typically serves as the sole form of guidance for foil motions in the plane of the sensor 100. There are typically no other constraints to rotation or translations of the foil. This stick-on sensor is envisioned to have the ability to track a traditional bonded gauge attached to the same specimen to an accuracy perhaps as low as 0.5 microns peak-to-peak (10 micro-strain peak-to-peak).

FIG. 6 illustrates an embodiment of the optical strain gauge wherein two foils are held directly on the specimen by adhesive patches. The optional transparent sleeve 60 at the right of the sensor in FIG. 6 serves to keep the loose end of the top foil in flush contact with the bottom foil. It does not impinge upon the optical active area of the sensor and is such a loose fit that it produces essentially no extra friction. Similarly, FIG. 7 is a close-up view of the adhesive patch gauge contact and spacer film. It should be noted that by using slightly thicker polyester substrates (such as 7 mil in place of 4 mil), the foils remain flush with the specimen surface during operation without any potential lifting of the loose end.

FIG. 8 shows the stack-up of the first and second films 50, 52 and the adhesive tape, thereby illustrating the simplicity of construction of this embodiment of the sensor 100. Each foil or film 50, 52 is held onto the specimen with a single rectangular piece of double sticky tape (adhesive patches 14 and 16) that is die cut to 12×6 mm. A small piece of transparent spacer film may be glued to the first film 50 (i.e., the top film) beforehand so that the top film 50 remains parallel to the bottom film 52 when the films 50, 52 were stuck to the surface of the specimen 1000. It is useful for the adhesive patches 14, 16 to be viewable by the camera so that an independent optical measurement of the patch gauge separation can be made remotely. Therefore, the patch (or the adhesive color itself) is typically high contrast and any component layers that cover it, such as spacer 53, are transparent so that the patch shows through to the camera.

Because one embodiment uses thin, flexible 4 mil polyester films, there may be a further configuration to further assure that the loose end of the top foil 50 is held flat against the surface of the bottom foil 52 without creating a source of friction. Several simple methods are available. One method is to glue a properly spaced over-hanging tab on the patch end of the bottom foil 52 that vertically constrains the loose end of the top foil 50. The tab overhang is typically only about 4 millimeters long and does not impinge on the optically active area of the sensor 100. The spacer height of the tab overhang is chosen to properly match the top surface of the top foil 50.

A further embodiment of the self-adhering optical displacement sensor is shown in FIG. 9. The high contrast white adhesive patches 14, 16 positioned on opposite ends of the sensor 100 are clearly visible to the camera. In this embodiment, the individual 4 mil photographic film images are each bonded to U-shaped transparent 10 mil polyester frames 114, 116 that serve to provide both stiffness and linear guide slots to keep the films flush to one another without friction.

The opposite side of the same composite specimen with a bonded gauge attached is shown in FIG. 10. The bonded gauge is mounted typically for comparative strain measurements. The entire back surface is typically polished smooth to accommodate the needs of the bonded gauge 101. There is typically little or no specimen surface preparation necessary for the self-adhering optical displacement sensor embodiment.

The images of the embodiments of the optical strain gauge 100 will now be disclosed in further detail. The OSG sensor typically includes two images, typically line grating patterns implemented on separate pieces of photographic film substrate (see, for example, grating foils 10, 12 of FIGS. 1 and 2), that are overlaid onto each other to produce an interference effect as one image moves with respect to the other. This disclosure defines geometry and image quality of the pair of film images, referred to as foils. However, it is envisioned that these may also be manufactured using a lithographic printing process. It is envisioned that there may be many variations (such as thin polyester substrates imprinted by printing technology) on the manufacturing process described below.

FIGS. 11 and 12 illustrate the patterns to be photographically imaged onto film to produce the bottom and top grating foils 10, 12, respectively. Each image occupies about 1.2 square inches, including fiducial marks used for alignment during assembly. During OSG assembly the two images are to be overlaid onto each other with their photographic emulsion surfaces facing each other. Therefore the top image, which will be flipped over onto the bottom image, is printed in reverse reading mode. They both will be right reading when they are overlaid.

The writing engine used to produce the films is an internal drum laser film recorder (imagesetter), or its equivalent in terms of image quality and linearity characteristics. A single page of output film will contain an array of dozens of these images with the two component images printed adjacent to each other to minimize any geometric differences between them. The foils will be precisely cut out from this page in pairs and assembled, along with other spacer and adhesive substrate layers, into multi-layer laminate stack OSG sensor.

The input to the film recorder may be, but is not limited to, a binary TIFF image file generated by a Matlab program. This will insure pixel-to-pixel integrity of every feature in image rather than to leave these details up to the vendor's raster image processing software which could make subtle image quality changes and assumptions. It allows these features to be controlled and modified at a pixel level independent of the vendor's RIP software.

The images may be produced from a binary TIFF file that is to be output at 2400 dpi addressability. Variations of this method may be used. Therefore each pixel in the binary will represent 10.58 microns in the exposed image. All dimensions given are based on an assumption of 2400 dpi addressability. The polarity of the TIFF file, whether a positive or negative image, will depend on the polarity of the photographic media used. For the purpose of this specification the TIFF file polarity will be defined as follows: 1=Laser ON, exposed pixel area on the film will be clear when the film is processed. All figures assume this polarity.

A typical image to be used for the bottom OSG foil 12 is shown in FIG. 11. It includes three corner fiducial marks and the sensor image, which is enclosed with dotted lines to aid film cutting. The dotted lines are optional. They, as well as location and type of fiducials, can be modified as necessary to suit the production assembly process and variations thereof. The illustrated 11×35 millimeter foil image as shown (enclosed by dotted lines) does not include any tail extensions that may be necessary as part of the assembly process, such as extensions out to the gauge contact point.

The foil image is shown in positive polarity, that is the white areas will be transparent in the exposed film. In the OSG laminate stack assembly there will be a reflective white backing layer (or equivalent) underneath this film so that the transparent areas will appear white, reflecting light back to the camera. Alternately, polyester foils could be printed with various color inks to provide the necessary contrast and reduce or eliminate the need for backing.

The image (which is intended to be illustrative of one embodiment) is composed of an 11×35 millimeter image region (1040×3308 pixels); a central 9×32 millimeter optical pattern area (850×3024 pixels), including uniformly spaced transverse lines, which is the optically active area of the sensor as viewed by the camera and is centered within the larger image region with a maximum extent of the patterned area of 9 millimeters (the 9 millimeter width is the maximum extent of the patterned area); a black border region that surrounds the patterned area to insure that there is a high contrast background for camera view of the patterns, regardless of any artifacts or other visual clutter that may be in end user's camera field of view; an optional small text region at the attachment end of the image to identify the foil and the pattern during cut and assembly process (this ID stays with the OSG assembly); and three fiducial marks associated with three corners of the sensor image region. One of their primary functions is to indicate where the corresponding three fiducials of the top foil should overlay. Each of the fiducials is offset from the image region corner by 3.0 millimeter vertically and 2.5 millimeter horizontally as shown. The horizontal axis is defined as the long axis of these figures.

The patterned area for this reference OSG design typically includes the following:

1. A 12-pixel ON by 12-pixel OFF line pattern extending over the full 32 millimeter length of the active area. At 2400 dpi addressability this represents a grating with 0.254 millimeter pitch. Maintaining a consistent and uniform addressability on all patterns is a critical image quality factor.

1a. Length and Height of line pattern: 3024×540 pixels (32×5.715 mm)

1b. Pattern is offset from lower left corner of patterned area: Horiz=0, Vert=35 pixels.

2. Three transparent dots, 1.5 millimeter diameter, used to provide foil tracking and initialization functions independent of fringe measurements. These will appear white in the final multilayer OSG assembly.

2a. Dots are oriented in a line along the axial measurement direction of the sensor.

2b. Dot centroids are separated by: 288 pixels (3.048 mm).

2c. Centroid of middle dot is offset from upper right corner of patterned area: Horizontal=576, Vertical=155 pixels.

3. A 16×2.5 millimeter (1512×240 pixels) transparent rectangle. In final assembly this will become a white reflective region over which the transparent dots on the overlaid Top foil can be viewed by the camera. The rectangle is offset from upper left corner of patterned area: Horiz=0, Vert=35 pixels.

The above contents definition for the central 9×32 millimeter optical pattern area represents a reference design. Generally, there are many other pattern sets that can be used in this region to achieve different OSG performance characteristics.

The dots are intended to be a temporary feature of the OSG design primarily used for demonstration purposes. They provide an independent method of live comparison for OSG measurement accuracy in demos. In addition they provide transverse motion measurement checks and data for image initialization prior to start of live measurement. Further embodiments may eliminate the dots.

A typical image to be used for the top OSG foil 10 is shown in FIG. 12. It includes three corner fiducial marks and the sensor image, which is enclosed with dotted lines to aid film cutting. Note that the 11×35 millimeter foil image as shown (enclosed by dotted lines) does not include any tail extensions that may be necessary as part of the assembly process, such as extensions out to the gauge contact point.

The foil image is shown in positive polarity, that is the white areas will be transparent in the exposed film. In the OSG laminate stack assembly this foil will be flipped over onto the bottom foil so that its emulsion side faces that of the bottom foil. The transparent areas of the top foil allow incident light to pass through it and be reflected back out to the camera by the non-opaque sections of the bottom foil assembly.

The three fiducials on the top foil image will typically overlay exactly onto the corresponding three fiducials on the bottom foil when it is flipped and overlaid onto it.

The illustrated image is composed of:

1. An 11×35 millimeter image region (1040×3308 pixels).

2. A central 9×32 millimeter optical pattern area (850×3024 pixels). This is the optically active area of the sensor as viewed by the camera and is illustrated as including periodic spaced transverse lines. It is centered within the larger image region. The 9 millimeter width is the maximum extent of the patterned area.

3. A black border region that surrounds the patterned area. This is to insure that there is a high contrast background for camera view of the patterns, regardless of any artifacts or other visual clutter that may be in end user's camera field of view.

4. A small text region (optional) at the attachment end of the image to identify the foil and the pattern during cut and assembly process. This ID stays with the OSG assembly.

5. Three fiducial marks associated with three corners of the sensor image region. Each of the fiducials is offset from the image region corner by 3.0 millimeter vertically and 2.5 millimeter horizontally as shown.

The illustrated patterned area for this OSG design includes the following:

1. A 12-pixel ON by 13-pixel OFF line pattern extending over the full 32 millimeter length of the active area. At 2400 dpi addressability this represents a grating with 0.2646 millimeter pitch. Maintaining a consistent and uniform addressability on all patterns is a critical image quality factor. Note that this reference OSG design expects a specific 24/25 ratio between the two overlaid patterns. Typical scale and linearity requirements are that the length and height of line pattern is 3024×540 pixels (32×5.715 mm) and that the pattern is offset from upper left corner of patterned area: Horizontal=0, Vertical=35 pixels.

2. Three transparent dots, 1.5 millimeter diameter, are used to provide foil tracking and initialization functions independent of fringe measurements. These will appear white in the final multilayer OSG assembly.

2a. Dots are oriented in a line along the axial measurement direction of the sensor.

2b. Dot centroids are separated by: 288 pixels (3.048 mm).

2c. Centroid of middle dot is offset from lower left corner of patterned area: Horiz=576, Vert=155 pixels.

3. A 16×2.5 millimeter (1512×240 pixels) transparent rectangle. In final assembly this will become a clear window through which the white dots on Bottom foil underneath can be viewed by the camera. The rectangle is offset from lower right corner of patterned area: Horiz=0, Vert=35 pixels.

Figure 13:
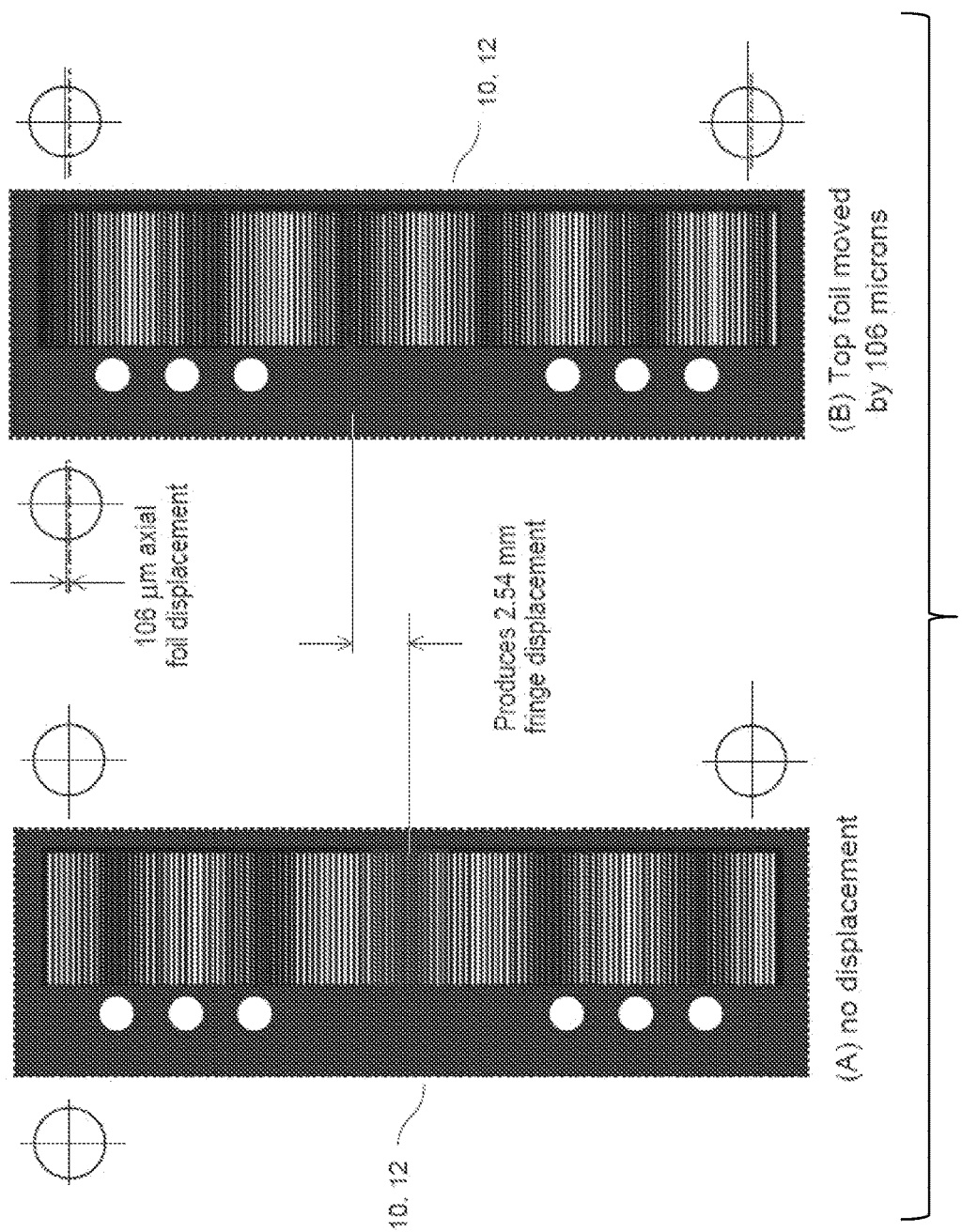
FIG. 13 is a view of an embodiment of the optical strain gauge from the camera, wherein the optical strain gauge is measuring zero strain ("A" side) and is a view of an embodiment of the optical strain gauge from the camera, wherein the optical strain gauge is measuring a displacement of 106 microns ("B" side).

A view of the OSG sensor from the perspective of the camera is given in FIG. 13. These figures show the overlaid top and bottom foils 10, 12 at two different relative displacements ("A" side and "B" side of figure) thereby generating an interference pattern with sinusoidally varying intensity wherein the phase is shifted between the two different relative displacements of the foils (locations of A side versus locations of B side). The fiducials, which ordinarily are trimmed off of the foils before assembly, were retained in the figure to indicate the degree of axial displacement between the foils. The text ID labels at the ends of the sensor were left off for clarity.

The line patterns used for displacement measurement typically have three important dimensional considerations—(1) linearity of spacing over length of pattern, (2) uniformity of line-to-line spacing, and (3) spacing stability over time and during sensor operation. The absolute scale of line spacing is typically important but not as critical because it can be measured if necessary, as part of the production process.

Typical lithographic requirements for pattern generation presented below are representative of a high quality internal drum laser film recorder generating patterns at 2400 dpi addressability. The ratio of diameter of exposing spot to elemental address size is nearly 1:1 for this type of recorder. Use of a system capable of higher image quality, for example 3600 dpi addressability, could potentially provide an increase in performance of OSG method.

A typical minimum addressability for pattern generation is 2400 dots per inch (dpi) while the typical minimum resolution of lithographic system is 50% MTF at 100 lines per millimeter. The typical linearity of repetitive line pattern pitch is 0.05% per 25 millimeter length and the typical line straightness for both the X and Y axes is 0.05% per 25 millimeter length. However, the use of printed polyester substrates reduces the required resolution and image quality.

The modulation transfer function (MTF) referenced above is a measure of a systems capability to reproduce fine detail and is analogous to defining a signal bandwidth limit. MTF is 100% for a very coarse sinusoidal pattern where all the detail is faithfully reproduced in the photographic media.

$$MTF=100*(maximum\ intensity-minimum\ intensity)/(maximum\ intensity+minimum\ intensity)$$

The optical strain gauge 100 operates by modulating and reflecting incident light. The light incident to the top surface travels through the transparent areas of two overlaid patterned foil layers, is reflected by white reflective surface layer underneath, to make the return trip back through the foils again and out to the remote camera. An effective method of defining the performance of these components is to describe the performance requirements of the whole assembly including two overlapped foils and a reflective layer underneath.

Typical reflectance requirements of the illustrated embodiment over the optically active area of the sensor are as follows—reflectance uniformity over non-opaque areas of assembled sensor: less than ten percent peak-to-peak variation; moire interference pattern reflects greater than fifty percent of illumination intensity (at brightest peak); moire interference pattern has greater than a thirty to one contrast ratio between light and dark peaks; and a maximum contrast variation over 25 millimeter pattern length is ten percent (peak-to-peak).

The following is a description of a typical optical strain gauge (OSG) processing. Dot tracking, if used, is excluded from this description.

Dots may or may not be used on the optical strain gauge pattern for (1) initial finding of optical strain gauge pattern areas (2) coarse tracking comparisons (3) as diagnostics tool to simultaneously demonstrate dot gauge measurement with the OSG gauge measurement. They are, at the top level, optional features. In one embodiment, six dots are tracked simultaneously with the optical strain gauge measurement. Therefore, further embodiments may simultaneously track dots, or at least be required to initialize using dot centroid data or equivalent coarse features.

The typical steps of initialization include:

1. The optical strain gauge fringe image is acquired and measured. This may be a single image or occur continuously at a non-real time frame rate (10 Hz response, for example) to produce the initialization data for the start of the test.

2. Automatically locate two fringe areas in video frame image. Some embodiments require only one fringe area to be measured, for example when there is no need for an adjacent reference fringe area.

3. Collapse the individual two-dimensional fringe regions of interest in transverse axis to produce an axial intensity signal vector for each region of interest.

4. Subtract mean intensity value from each vector.

5. Multiply this vector by a second, equal length vector containing a fixed weighing factor, for example, a Hanning weighting function.

6. Calculate the Fast Fourier Transform of this fringe signal vector providing a magnitude and phase vector.

7. Automatically locate three specific peaks in the magnitude vector of the Fast Fourier Transform. The rough spatial frequencies of these peaks are known beforehand from (1) pattern geometry and (2) a rough estimate of the camera optical magnification factor (mm/camera pixel). These frequency spectra represent the three pattern components visible to the camera: the top foil pattern, the bottom foil pattern and the moire interference pattern. Some embodiments require only two pattern components to be measured.

8. Measure the phase of each of these spectra at their respective peak locations. These peak address locations will be used throughout the rest of the optical strain gauge operation to measure phase in live mode. There is typically no need to track the peaks in live measurement mode. However, peak (pitch) tracking during live measurement mode can be useful for other embodiments.

9. Error checking occurs at this point to verify that we have correct signal and correct frequency spectra.

10. Highly accurate measurements of camera optical magnification factor and phase-to-position gain factor are made from the frequency spectra measurements—scalar math. These initial fixed gain factors are used throughout the live test mode to scale the Fast Fourier Transform phase measurement data into a correct gauge length measurement.

A live test typically includes the following steps:.

1. Automatically track movements of the fringe regions of interest in similar manner as tracking a dot region of interest.

1a. If the phase shift of the reference grating moves more than the equivalent of two camera pixels the region of interest of the fringe is shifted to catch up with it.

1b. Region of interest shape and size are typically fixed as established in the initialization phase.

1c. Phase measurements are made before and after each shift of the region of interest so that the phase can be accurately recalibrated to the new region of interest.

2. Low strain specimens, such as composites, typically require no region of interest tracking shifts.

3. Collapse the individual fringe regions of interest in transverse axis to produce an intensity signal vector for each region of interest.

4. Subtract mean intensity value of each vector.

5. Multiply this vector by a second, equal length vector containing a fixed weighing factor.

6. Calculate the Fast Fourier Transform of the fringe signal vector to provide a magnitude and phase vector. This live Fast Fourier Transform measurement serves as an example. It should be appreciated that with only two or three pre-established fixed spectral wavelengths to be measured that other alternative sine wave correlation methods could be used to produce the necessary phase measurement. The magnitude component in live measurement mode may be for diagnostics only.

7. Measure the phase of each of spectra at their respective peak locations. These peak address locations were determined during initialization phase.

8. Use fixed gain factors established during initialization to scale the live Fast Fourier Transform phase measurement data into correct gauge length measurements.

The optical strain gauge may be envisioned as a competitive alternative to using a bonded strain gauge in many of its traditional applications. The scale of the optical strain gauge can be significantly changed up or down, from satellite ground target application to microscopic displacement sensing, and still preserve its fundamental advantages:

1. Displacement sensing accuracy exceeds precision and linearity of the foil gratings used by orders of magnitude—typically, accuracy of 0.5 microns achieved using only a printed plastic grating of 4 lines/mm with its inherent linearity error (up to 0.1%)

2. Remotely read by wireless methods

3. Self-calibrating—the optical strain gauge device itself provides its own calibration features—no need to calibrate the camera global image space and require that it remain stable throughout the test.

4. Displacement (or strain) range is orders of magnitude greater than a traditional bonded strain gauge.

5. Can be repetitively used up to displacement limits without breakage, physical distortion or cumulative error effects.

6. Multiple sensors can be viewed and processed simultaneously by a single remote camera.

7. Multiple sensors can be at different orientations.

8. Low resolution requirements for remote reading camera, web cam capable.

9. Remote reading is largely independent of camera orientation, vibration, depth of field and focus effects.

10. Unlike a bonded strain gauge, it can be tested to its limits at the factory without breakage or distortion to record exact gain data for each device or to tune each device to an exact gain.

11. Note that these advantages are typically achievable without relying on the effective displacement magnification factor common to moire interference. In this case the camera needs to be able to resolve the pitch of the fundamental patterns on each foil—any easy task in the current application where the fundamental pitches are larger than 5 camera pixels.

Figure 14A:
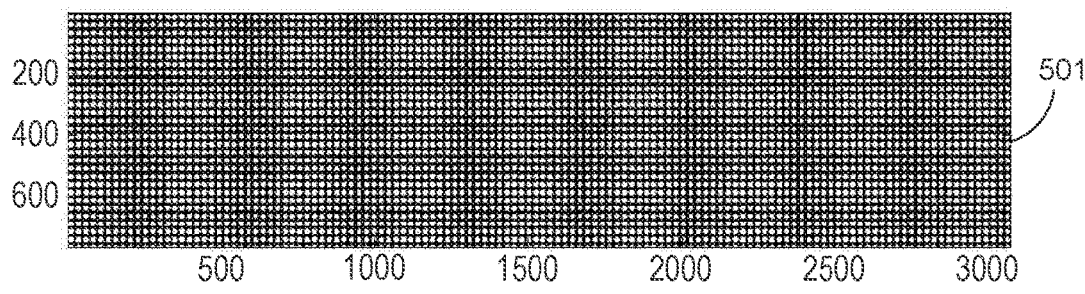
FIG. 14A, 14B and 14C illustrate the two dot array patterns and the interference pattern resulting from overlay of two dot array patterns for measuring strain over two orthogonal axes.
Figure 14B:
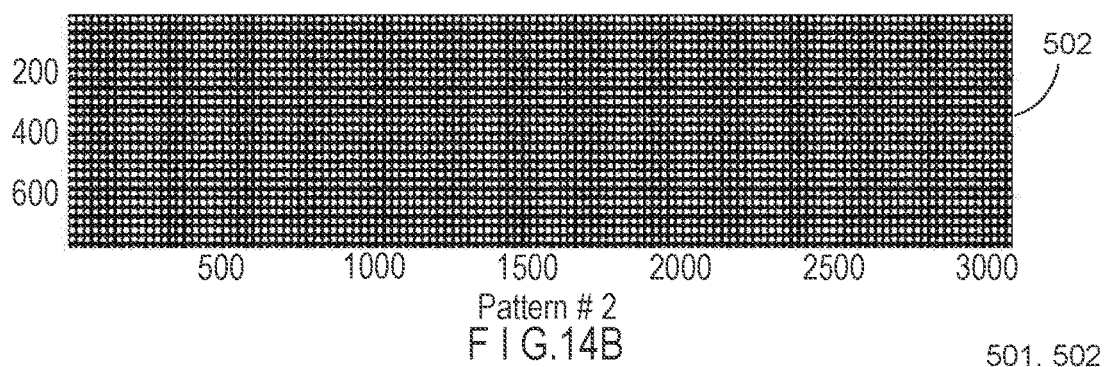
Figure 14C:
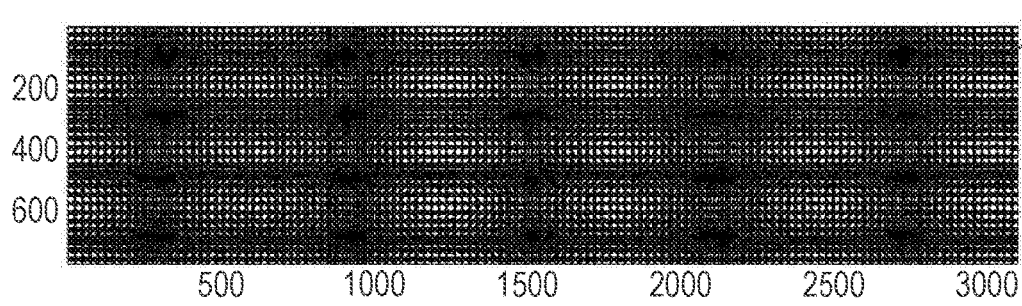

The optical strain gauge can be configured to measure two orthogonal axes of displacement simultaneously with minimal impact on computer processing load by using a dot matrix or equivalent array pattern. FIGS. 14A-C show the interference pattern resulting from orthogonal overlay of two dot array patterns. Two fundamental patterns 500, 501 are illustrated in FIGS. 14A and 14B, respectively, and the overlaid pattern is illustrated in FIG. 14C. Each axis can have an independent moire gain and pitch value. In this example the two patterns were designed to work in the optical strain gauge configuration to provide precision measurement of foil transverse motions and rotation in addition to axial strain measurement. These additional foil motions monitored provide real-time measurement of certain contact quality and alignment issues that may, in the future, be compensated by this extra data. They are an example of providing additional encoded content to produce Fourier spectral lines for set-up and auto-calibration that are implemented in both axes of the detector.

Another variation of dual-axis optical strain concept is to measure two independent gauge length pairs, simultaneous transverse and axial strain for example. Similar array patterns could be implemented in two pairs of adjacent overlapped foils with orthogonal gauge contacts, or possibly even with all four foils overlapped in one window. With the adhesive contact method it is easy to imagine a cross-shaped Bandaid-like structure with four contact pads and a common central window where all four overlapped foils are observed at once.

With the two-dimensional dot array pattern it appears theoretically possible to measure axial and transverse strain with just a single pair of overlapped foils and two gauge contact points that are set at a diagonal. The axial separation component of the diagonal used for axial gauge length and the orthogonal component used for transverse gauge length. The two-dimensional sensing pattern tracks the independent x-y displacements of both contact points.

The strained foil concept is a variation that preserves the fundamental assets of the optical strain gauge as listed above but uses a stressed foil with single unstressed (rigid) foil overlaid onto it (or adjacent to it). The unstrained foil provides an integrated reference pattern—it performs the function of the second foi in the OSG concept of two overlapped foils. The motions of the reference foil are not critical so, for example, it can essentially just float on the surface of the strained pattern without regard to its subtle motions. One embodiment that demonstrates the simplest configuration is to print a line pattern directly onto the specimen and overlay this with a rigid film containing the reference pattern which is simply held on to the specimen by the surface tension of a small quantity of transparent grease.

The integration of a strained and unstrained foil provides unique opportunities for direct strain calibration (as opposed to just displacement calibration). The stressed foil can take the form of simply a pattern printed directly onto the specimen, an elastic foil or film with a pattern printed on it attached over the whole surface or attached only by two adhesive patches at the gauge points. Instead of a simple patterned film that stretches, a more complex strain sensitive foil structure could be used that produces a periodic visual effect when overlaid with the fixed rigid reference pattern.

Another application of a stressed foil is to provide a method of calibrating absolute strain for every optical strain gauge in situ, just before the start of a test, as part of an initialization process during pre-load or grip closing phases for example. This addition of a strained grating component, a stressed foil, provides data to calibrate absolute strain response of the OSG rather than just rely on absolute displacement calibration and knowledge of initial contact gauge as is currently implemented in the optical strain gauge. In this application the stressed foil can even take the form of a one shot event, analogous to an electric fuse, that breaks or changes in a known way at an exactly calibrated strain level. Ideally it would provide a calibration point at a very low strain value, say less than 0.1%, so that the installed optical strain gauge is calibrated/validated prior to the specimen incurring any significant stress level. The objective of this idea is to provide an alternative to, or to supplement, having exact knowledge of the effective specimen gauge points of contact. Note that the strain resolution of the current OSG configuration is better than 0.000005% strain (5 micro-strain) so calibrating at 0.1% could be feasible.

An optical strain gauge concept variation is a projection method where one of the component patterns 510 is optically projected onto the specimen, for example by a low cost, compact package containing a laser diode and diffractive optical element that projects an array of dots or lines onto the specimen surface (see FIG. 15). This pattern becomes the reference pattern which interferes with a similar stressed pattern printed onto the specimen. The pattern put on the surface of the specimen can be implemented in ink by a rubber stamp, a stretchable adhesive decal, a thin elastic film with an array of marks that move with the strain of the surface underneath or other method that is low cost and easy to apply.

Diffractive optical elements (DOE) are custom designed holographic patterns implemented in an inexpensive medium such as plastic where the multi-beam forming images are pressed from a master holographic image much like a CD recording. Coupled with a laser diode they typically provide a low cost, compact method for projecting fixed laser patterns at relatively long distances without any moving parts.

Another potentially ultra-low cost projected pattern method is to use the internal structure of a standard bar code reader. The core of the device, typically inexpensive mass-produced, is a compact flying spot laser scanner and single photodiode read head all in unit 520 about a ½ inch cube (see FIG. 16). The laser beam is scanned progressively along an axial line on the specimen surface. The element steering the laser beam also steers the viewing point of the single photodiode so that this single device becomes both the patterned light source and the camera. The projected reference pattern is created by modulating the scanning laser spot as it moves across the specimen surface. As before, a pattern will be printed onto the specimen that will be visually compared with the projected pattern by monitoring combined interference and phase shift effects. Note that a characteristic of this method is that projected pattern can be tuned during the test to appropriately interfere with and track the moving pattern on the specimen. Thus the image quality of the simple pattern formed on the specimen typically can be extremely relaxed and variable, because its imperfections will be measured and adapted to in real time, which may greatly simplify the method of implementing the surface pattern.

Thus the several aforementioned objects and advantages are most effectively attained. Although preferred embodiments of the invention have been disclosed and described in detail herein, it should be understood that this invention is in no sense limited thereby.

What is claimed is:

1. A strain gauge, including:
   a first foil with a first pattern;
   a second foil with a second pattern;
   the first foil and the second foil overlapping with each other thereby overlapping the first pattern and the second pattern and generating an interference pattern;
   the first foil including a first end and a second end, the first end of the first foil including a first device for attachment to a specimen;
   the second foil including a first end a second end, the second end of the second foil including a second device for attachment to a specimen;
   a distance between the first device for attachment and the second device for attachment defining a gauge length for strain measurement of the specimen;
   wherein strain on the specimen changes the distance between the first and second devices for attachment and causes relative movement of the first foil with respect to the second foil thereby causing changes in the interference pattern;
   wherein the strain gauge is free of a fixed reference pattern; and
   wherein the strain is determined by algorithmic analysis of a video or photographic image of the interference pattern, free of algorithmic analysis of any fixed reference pattern.

2. The strain gauge of claim 1 wherein strain is determined by monitoring changes in the interference pattern during a period in which strain is induced on the sample.

3. The strain gauge of claim 2 wherein the video or photographic image of the interference pattern is analyzed by Fast Fourier Transform methods.

4. The strain gauge of claim 2 wherein the video or photographic image of the interference pattern is analyzed remote from the strain gauge.

5. The strain gauge of claim 4 wherein the first and second patterns are respective first and second grating patterns.

6. The strain gauge of claim 5 wherein the interference pattern has modulated intensity.

7. The strain gauge of claim 5 wherein the interference pattern has sinusoidally varying intensity.

8. The strain gauge of claim 7 wherein a change in the distance between the first and second devices for attachment cause a shift in the interference pattern.

9. The strain gauge of claim 8 wherein the shift in the interference pattern is at least 20 times greater than the change in distance between the first and second devices for attachment.

10. The strain gauge of claim 1 wherein the first and second patterns include orthogonal pattern components thereby generating an interference pattern which responds to strain in two orthogonal directions.

11. The strain gauge of claim 1 further including means for holding the first and second foils together as an integrated assembly with a predetermined gauge length.

12. The strain gauge of claim 1 further including a removable compliant packaging layer on a surface thereof.

13. A method of measuring strain with a strain gauge, including the steps of:
   providing a first foil with a first pattern;
   providing a second foil with a second pattern, the first foil and the second foil overlapping with each other thereby overlapping the first pattern and the second pattern and generating an interference pattern, the first foil including a first end and a second end, the first end of the first foil including a first device for attachment to a specimen; the second foil including a first end a second end, the second end of the second foil including a second device for attachment to a specimen; a distance between the first device for attachment and the second device for attachment defining a gauge length for strain measurement of the specimen;
   wherein strain on the specimen changes the distance between the first and second devices for attachment and causes relative movement of the first foil with respect to the second foil thereby causing changes in the interference pattern; and
   wherein the method is free of providing a fixed reference pattern on the strain gauge;
   determining strain by algorithmic analysis of a video or photographic image of the interference pattern, free of algorithmic analysis of any fixed reference pattern.

14. The method of claim 13 wherein the step of determining strain includes the step of monitoring changes in the interference pattern during a period in which strain is induced on the sample.

15. The method of claim 14 wherein the step of determining strain includes the step of analyzing the video or photographic image of the interference pattern by Fast Fourier Transform methods.

16. The method of claim 14 the step of analyzing the video or photographic image of the interference pattern is performed remotely from the strain gauge.

17. The method of claim 16 wherein the first and second patterns are respective first and second grating patterns.

18. The method of claim 17 wherein the interference pattern has modulated intensity.

19. The method of claim 17 wherein the interference pattern has sinusoidally varying intensity.

20. The method of claim 19 wherein a change in the distance between the first and second devices for attachment cause a shift in the interference pattern.

21. The method of claim 20 wherein the shift in the interference pattern is at least 20 times greater than the change in distance between the first and second devices for attachment.

22. The method of claim 13 wherein the first and second patterns include orthogonal pattern components thereby generating an interference pattern which responds to strain in two orthogonal directions.

23. The method of claim 13 further including the step of providing means for holding the first and second foils together as an integrated assembly with a predetermined gauge length.

24. The method of claim 13 further including the step of providing a removable compliant packaging layer on a surface thereof.

* * * * *